(12) United States Patent
Schneider (10) Patent No.: US 8,944,374 B2
(45) Date of Patent: Feb. 3, 2015

(54) SAFETY CABIN

(75) Inventor: Uwe Schneider, Jork Königreich (DE)

(73) Assignee: Airbus Operations GmbH (DE)

( * ) Notice: Subject to any disclaimer, the term of this patent is extended or adjusted under 35 U.S.C. 154(b) by 590 days.

(21) Appl. No.: 12/747,306

(22) PCT Filed: Oct. 20, 2008

(86) PCT No.: PCT/EP2008/064122
§ 371 (c)(1),
(2), (4) Date: Jun. 10, 2010

(87) PCT Pub. No.: WO2009/080385
PCT Pub. Date: Jul. 2, 2009

(65) Prior Publication Data
US 2010/0264268 A1   Oct. 21, 2010

Related U.S. Application Data

(60) Provisional application No. 61/008,424, filed on Dec. 20, 2007.

(30) Foreign Application Priority Data

Dec. 20, 2007   (DE) .......................... 10 2007 061 423

(51) Int. Cl.
  *B64D 11/00*   (2006.01)
  *B64C 1/06*    (2006.01)
(52) U.S. Cl.
  CPC .............. *B64C 1/066* (2013.01); *B64D 11/003* (2013.01)
  USPC .................... 244/118.5; 244/123.13; 244/120

(58) Field of Classification Search
  USPC .............. 244/118.5, 123.13, 120, 119, 129.1, 244/131, 123.6, 118.2
  See application file for complete search history.

(56) References Cited

U.S. PATENT DOCUMENTS

| 3,390,495 | A | * | 7/1968 | Dalby | 52/222 |
| 4,083,153 | A | * | 4/1978 | Sumpter | 52/28 |
| 4,319,528 | A |   | 3/1982 | Gutridge et al. | |
| 4,739,955 | A |   | 4/1988 | Aquino et al. | |
| 4,799,631 | A | * | 1/1989 | Humphries et al. | 244/118.5 |

(Continued)

FOREIGN PATENT DOCUMENTS

| DE | 805498 C | 5/1951 |
| DE | 102005044378 A1 | 3/2007 |

(Continued)

*Primary Examiner* — Rob Swiatek
*Assistant Examiner* — Vicente Rodriguez
(74) *Attorney, Agent, or Firm* — Lerner, David, Littenberg, Krumholz & Mentlik, LLP (57) ABSTRACT

The invention relates to a cabin system for an aircraft fuselage, having one or more lining components for interior lining, and optionally one or more cabin equipment components, wherein the lining component can be installed either separately or in combination with a further lining component and/or a cabin equipment component under tension in the aircraft fuselage such that a cabin that is under tension in the circumferential direction and attaches to the aircraft fuselage is defined. In this manner a passenger cabin configured as a closed safety cell is created in a fuselage, which is of particular advantage in an aircraft fuselage made of a fiber composite material because no splinters or the like can penetrate the self-supporting passenger cabin in case of damage to the same.

12 Claims, 6 Drawing Sheets

(56) References Cited

U.S. PATENT DOCUMENTS

| | | | |
|---|---|---|---|
| 4,947,762 A * | 8/1990 | Perzl et al. | 105/329.1 |
| 5,044,578 A * | 9/1991 | White et al. | 244/119 |
| 5,842,668 A * | 12/1998 | Spencer | 244/118.1 |
| 7,455,263 B2 * | 11/2008 | Lau et al. | 244/118.5 |
| 7,461,816 B2 * | 12/2008 | Schwartz et al. | 244/117 R |
| 2006/0237585 A1 | 10/2006 | Lau et al. | |
| 2007/0284479 A1 | 12/2007 | Pein et al. | |
| 2008/0308676 A1 * | 12/2008 | Muller | 244/119 |
| 2009/0250554 A1 | 10/2009 | Graeber et al. | |
| 2009/0304979 A1 * | 12/2009 | Mueller et al. | 428/69 |

FOREIGN PATENT DOCUMENTS

| | | |
|---|---|---|
| DE | 102006016509 A1 | 10/2007 |
| DE | 102006048376 A1 | 4/2008 |
| EP | 0279620 A2 | 8/1988 |
| EP | 0437870 A1 | 7/1991 |
| EP | 1557355 A1 | 7/2005 |
| GB | 573725 A | 12/1945 |
| JP | 2009508081 A | 2/2009 |
| WO | 2006136804 A1 | 12/2006 |
| WO | 2007031321 A1 | 3/2007 |
| WO | 2008043557 A1 | 4/2008 |

* cited by examiner

SAFETY CABIN

CROSS-REFERENCE TO RELATED APPLICATIONS

This application is a national phase entry under 35 U.S.C. §371 of International Application No. PCT/EP2008/064122 filed Oct. 20, 2008, published in German, which claims the benefit of the filing date of U.S. provisional patent application No. 61/008,424, filed on Dec. 20, 2007, and German patent application no. 10 2007 061 423.5, filed on Dec. 20, 2007, the disclosures of which are incorporated herein by reference.

FIELD OF THE INVENTION

The invention relates to a cabin system for an aircraft fuselage, comprising one or several lining components for lining the interior, and optionally comprising one or several cabin equipment components.

BACKGROUND TO THE INVENTION

Such cabin systems are well known. Usually in known cabin systems the lining components or all cabin components, respectively, are primarily attached to the external structure of an aircraft, which at present is usually still predominantly made of aluminium. In the development of modern aircraft fuselages comprising fibre composite materials, for example CFP (carbon-fibre reinforced plastic), passenger comfort also requires interior linings whose attachment is planned for use with the same or a similar technique. However, a fuselage comprising such composite materials needs to meet requirements that differ from those of an aluminium fuselage. In the case of damage occurring as a result of impact a CFP fuselage does not deform, but instead splinters or fragments. For this reason it must be ensured that splintered or fragmented material does not penetrate the passenger cabin of the aircraft. Conventional cabin concepts do not provide any help in this context, because they are designed to cope with easily controllable metal fuselages. The integration of an interior lining or cabin, which safely resists penetration of splinters or fragments from the outside, into an aircraft fuselage made from CFP or similar materials requires that said interior lining essentially provides a closed safety cell. In the case of damage to the fuselage no foreign objects must enter the cabin, thus potentially injuring passengers in the cabin.

From EP 0 279 620 B1 a self-contained interior lining for an aircraft fuselage is known, which is, however, in particular designed to reduce noise exposure in the interior of the passenger cabin. In this arrangement the proposed interior lining has several interconnected components that comprise a honeycomb structure with additional insulation material. This cocoon design is implemented with the use of a multitude of panels that adjoin each other and that in each case are attached to several positions on the aircraft fuselage. This design is associated with a disadvantage in that a multitude of connection elements need to be affixed within the aircraft fuselage, to which connection elements the panels are fixed. This is extremely unfavourable in a CFP fuselage, because such connection elements involve very considerable integration expenditure, are difficult to repair, and reduce the mechanical quality of the preferably smooth surfaces of the fuselage.

PRESENTATION OF THE INVENTION

It is thus the object of the invention to reduce or entirely eliminate the above-mentioned disadvantages. In particular, it is the object of the invention to propose an interior lining or a cabin for an aircraft fuselage, which interior lining or cabin provides a self-contained safety cell against the ingress of damaged, i.e. splintered or fragmented, fuselage material, which interior lining or cabin can in a particularly easy manner be integrated in the aircraft fuselage. In this context the notion of easy installation denotes that the smallest possible number of connection elements in the interior of the aircraft fuselage are required to attach the interior lining.

As stated in claim 1, this object is met by a cabin system for an aircraft fuselage, comprising one or several lining components for lining the interior, and optionally comprising one or several cabin equipment components, wherein the lining component can be installed under tension in the aircraft fuselage either separately or combined with a further lining component and/or a cabin equipment component in such a manner that a cabin that is under tension in circumferential direction and that fixes itself to the aircraft fuselage is defined.

By means of such a cabin system according to the invention a particularly safe cabin can be constructed that comprises characteristics of a safety cell. All the components used can be combined and can be tensioned among one another so that they conform to the contour of the fuselage and affix themselves to the fuselage without the need to provide a multitude of connection elements and openings. In particular in the case of aircraft fuselages made from fibre composite materials this results in a continuous and advantageous fibre alignment of structural elements, which in turn results in improved mechanical strength and quality and also ensures that splintering or fragmenting material cannot enter the cabin through a safe cabin wall that is structurally self-contained even if the fuselage is damaged. In addition, costs of components and installation are reduced because installation can be carried out more quickly because there are no longer any separate connection elements. Moreover, the cabin that comprises such lining components according to the invention is of a particularly low-maintenance character because no attachment elements or tools are required for its installation or deinstallation. In an ideal case the attachment principle is invisible to passengers, and no component requires deinstallation of other components.

Advantageous embodiments of this invention are provided in the subordinate claims.

Below, the invention is explained in more detail with reference to the figures. In the figures the same reference characters are used for identical objects.

DETAILED DESCRIPTION OF THE EXEMPLARY EMBODIMENTS

Figure 1A:
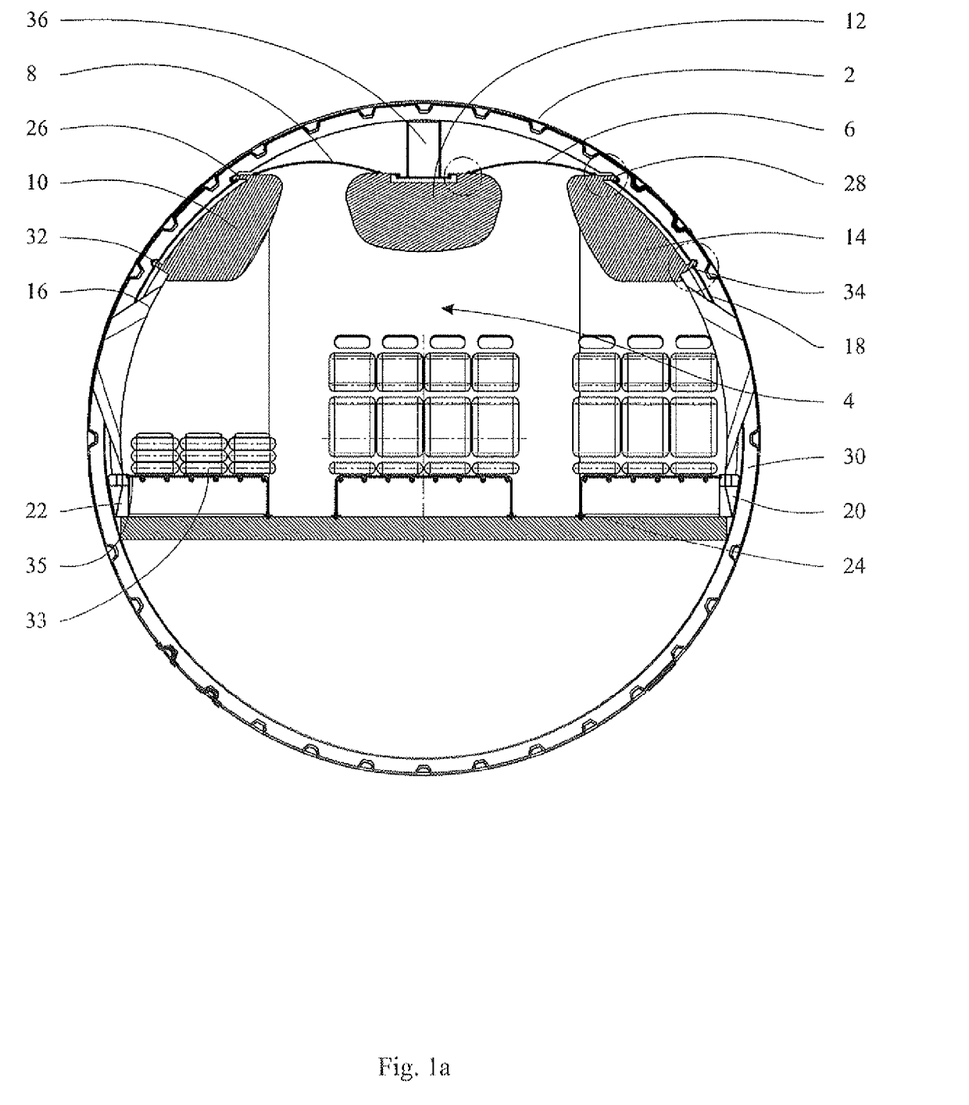
FIG. 1*a*: a diagrammatic overview of a cabin design according to the invention.

FIG. 1*a* shows a cross section of an aircraft fuselage 2 into which a cabin 4 is integrated. The cabin 4 comprises ceiling lining components 6 and 8, overhead bins (also known as hatracks) 10, 12 and 14, lateral lining components 16 and 18, supply ducts 20 and 22, as well as a cabin floor 24. These elements 4 to 24 together define at least one section of a passenger cabin in the form of a closed safety cell.

The above-mentioned components preferably comprise an impact-resistant material, for example glass-fibre reinforced plastic (GFP) or a similar laminate comprising aramid fibres. The strength of the material can be increased by providing additional intermediate layers comprising Kevlar. The material is, in particular, suitable to resist impacts of splinters or fragments of the fuselage material.

In this diagram the two lateral overhead bins 10 and 14 are each hooked into frame elements 30 by an upper end 26 and 28, and are each detachably locked into place in the frame elements 30 by means of a lower end 32 and 34. As a result of this the overhead bins 10 and 14 are mechanically firmly connected to the structure of the aircraft fuselage 2. The ceiling lining components 8 and 6 connect to the upper ends of the overhead bins 10 and 14, wherein the outer edge, in this view, of said ceiling lining components 8 and 6 is inserted in the overhead bin 10 or 14, while their respective other edge, which points towards the interior of the cabin, is inserted into the upper overhead bin 12.

The upper overhead bin 12 is hooked into a ceiling beam 36 in a manner similar to an aerial cableway. The ceiling beam 36 in turn is attached to the frame elements 30 at the top of the cabin 4 and protrudes essentially vertically from the fuselage surface into the cabin 4.

In each case the lower ends of the overhead bins 10 and 14 connect to the lateral lining components 16 and 18. These lateral lining components 16 and 18 are inserted in the overhead bins 10 and 14 by their upper edges, and are held in or on the supply ducts 20 and 22 by their lower edges. The supply ducts 20 and 22 are firmly connected to the frame elements 30; they provide ducts for all types of line systems, for example water, air, electricity and the like. At their respective lower ends the supply ducts 20 and 22 form the border of the lateral lining of the cabin and adjoin the floor 24. Within the passenger cabin 4, seats 33 can be placed entirely variably, by means of modular division, and independently of other cabin equipment components, wherein lateral seats 33 can be attached to the supply ducts 20 and 22 by way of seat adapters 35. Seat electronic devices can be supplied with data and electricity by means of lines, wherein said data and electricity are provided by way of the supply ducts 20 and 22. Furthermore, all the structural components of the aircraft fuselage 2 become interconnectable by way of the supply ducts 20 and 22 so that there is no longer a need to provide passenger seat rails for this purpose.

With this design it is possible to provide a passenger cabin in the form of a closed safety cell in an aircraft fuselage 2 without arranging a multitude of attachment elements or connection elements on the aircraft fuselage. The otherwise commonly used holding arrangement of the lining components 6, 8, 16 and 18 in separate holding devices on the frame elements 30 is not required because in the cabin system according to the invention all the lining components 6, 8, 16 and 18 are only plugged in.

Installation of the lining components 6, 8, 16 and 18 takes place with the overhead bins 10 and 14 hooked in, but with their lower ends 32 and 34 not yet locked into place in the frame elements 30. Due to gravity, the lower ends 32 and 34 of the hooked-in overhead bins are clearly spaced apart from the frame elements 30 when the overhead bins are hooked in. Consequently it is easy to insert the lateral lining components 16 and 18 in the respective supply ducts 20 and 22 as well as in the lower ends of the overhead bins 10 and 14. By locking into place the overhead bins 10 and 14, the clearance between the lower ends 32 and 34 of the overhead bins 10 and 14 and the respective supply ducts 20 and 22 that are arranged underneath the former is reduced, so that after locking into place the overhead bins 10 and 14 the lateral lining components 16 and 18 are radially tensioned and as a result of this push against the frame elements 30 so that affixation of the lining components 16 and 18 to the aircraft fuselage 2 takes place.

In order to provide the best possible sound insulation and thermal insulation, the lining components and the cabin fitting and fitment components, i.e. in this exemplary case the overhead bins 10, 12 and 14, can comprise insulation materials that are affixed to the surfaces that face the fuselage 2.

Figure 1B:
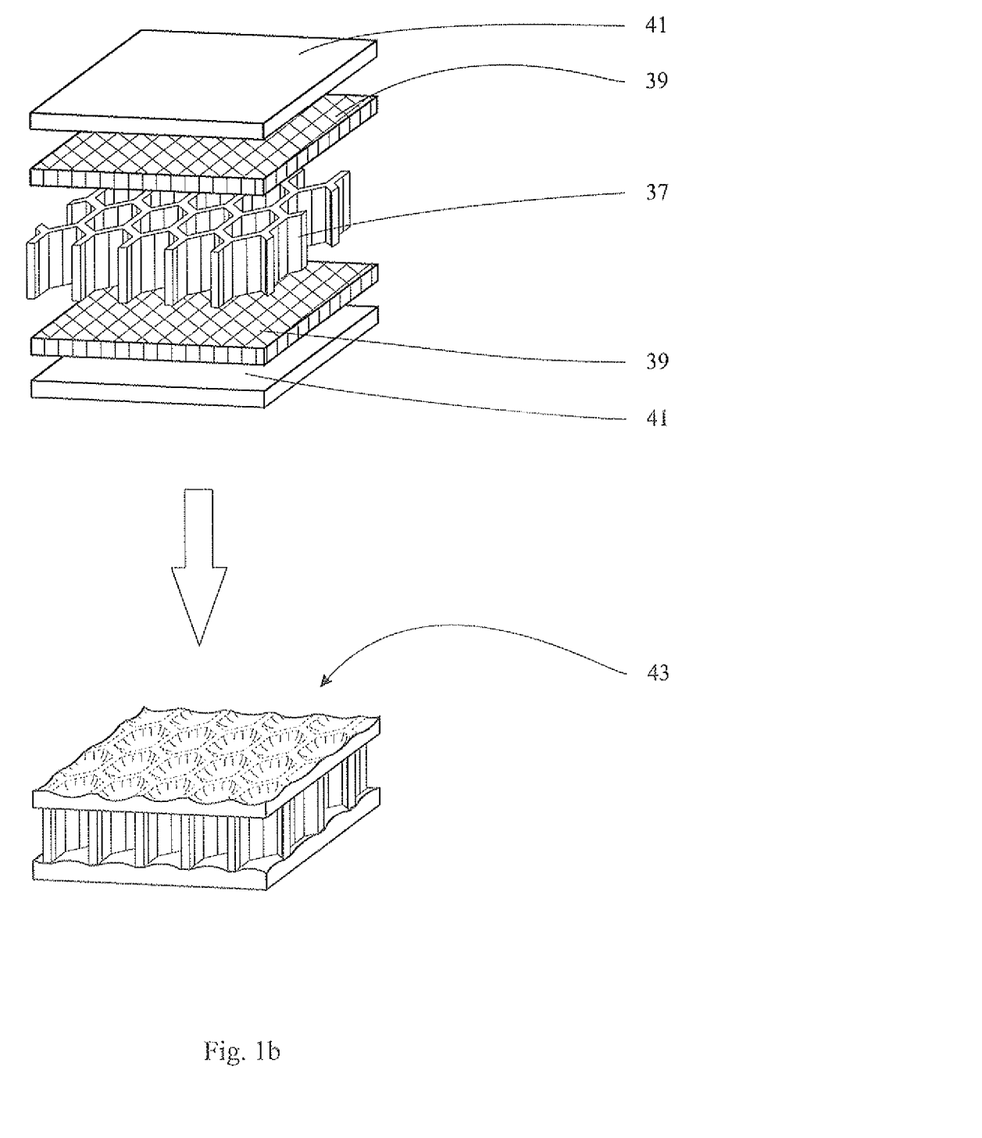
FIG. 1*b*: a diagrammatic view showing the materials of cabin components.

An advantageous materials design of the lining components 6, 8, 16 and 18 as well as of the overhead bins 10, 12 and 14 could—as shown in FIG. 1*b*—for example comprise a honeycomb core 37 that can be made from aluminium sheet, foamed aluminium or Duroplast. Preferably, on each side of the honeycomb core 37 there is an adhesive layer 39, which in each case on its face pointing away from the honeycomb core 37 comprises an end layer comprising a planar thermoplastic laminate 41. A material composed in this manner can be altered by treatment in an autoclave to such an extent that the thermoplastic layers 41 and the honeycomb core 37 interconnect so that the thermoplastic layers 41 form uniform indentations 43 of approximately hexagonal shape which protrude into the individual honeycombs of the honeycomb core 37. This results in a highly rigid, load-bearing, light-weight material for the cabin components presented.

Figure 2A:
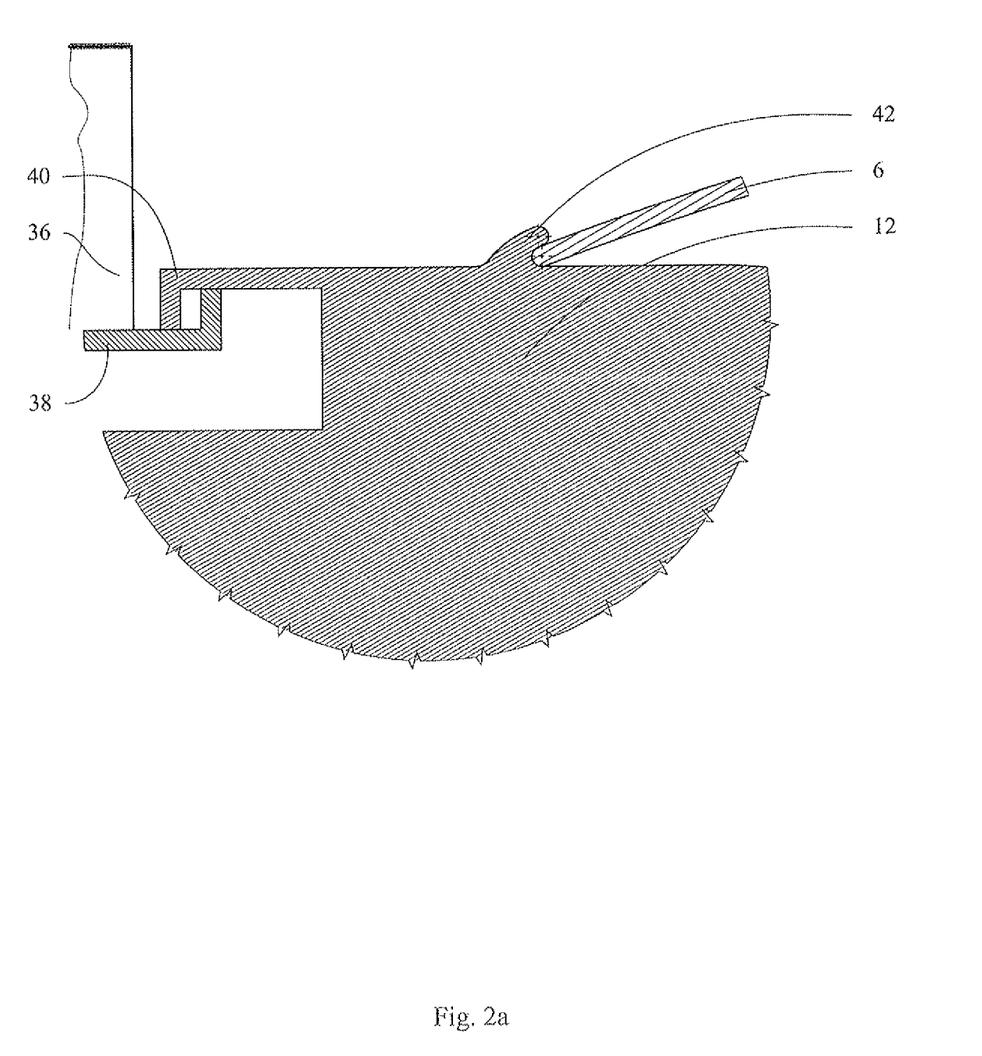
FIG. 2*a*: a detailed view of a hook-in hatrack.

FIG. 2*a* shows an example of an option of hooking the middle overhead bin 12 into a ceiling beam 36. On its side facing the cabin 4 this ceiling beam 36 comprises, for example, a U-profile 38, whose opening points towards the cabin ceiling. A corresponding downward-pointing profile section 40 can be hooked into this U-profile 38, which profile section 40 is attached to the overhead bin 12. As a result of this the overhead bin 12 is safely suspended from the ceiling beam 36 and for this reason forms a suitable counter bearing for the ceiling lining components 6 and 8. FIG. 2*a* shows only the right-hand part of the overhead bin 12, as an example, which overhead bin 12 comprises a collar 42 into which the right-hand ceiling lining component 6 can be inserted by its edge that faces the ceiling beam 36.

Figure 2B:
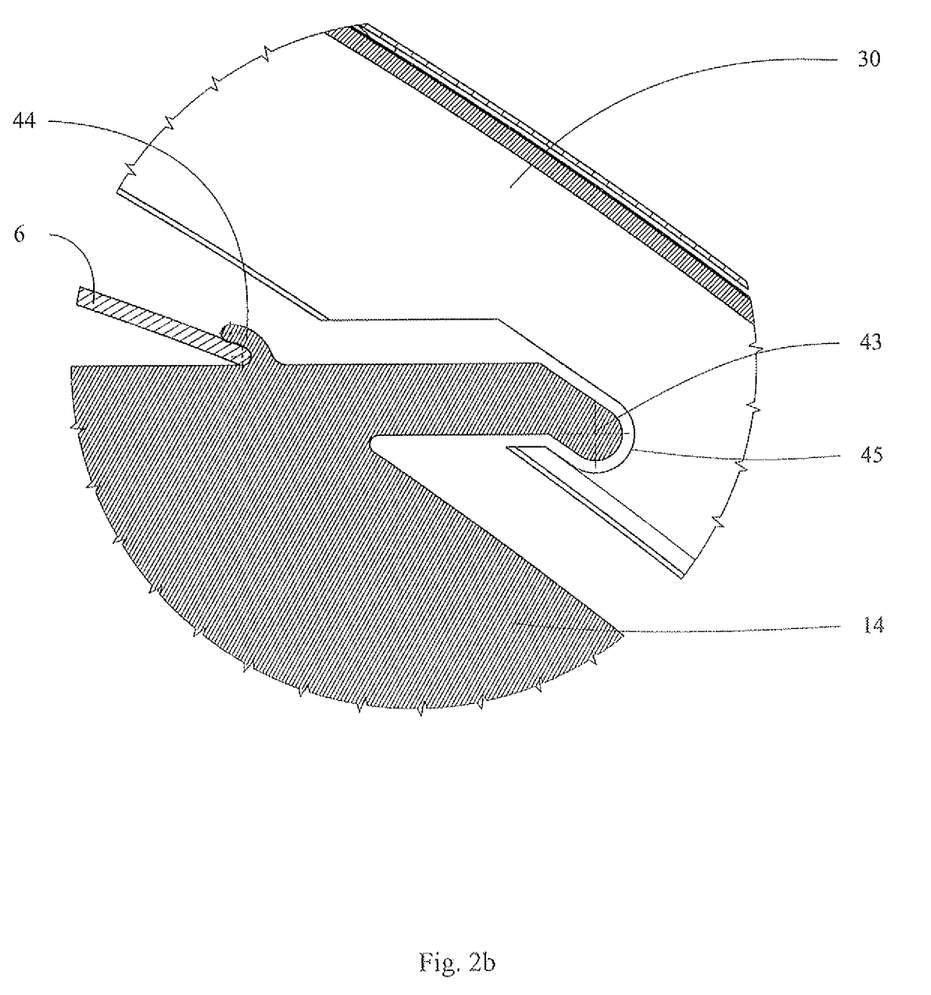
FIG. 2*b*: a hatrack holder on the frame elements.

The corresponding opposite edge of the ceiling lining 6 is inserted into a corresponding collar 44 of the overhead bin 14, as is shown in FIG. 2*b*. The exemplary illustration of FIG. 2*b* shows that the collar 44 will be spaced apart from the collar 42 by a greater distance—if the overhead bin 14, by way of a projection 43, is only hooked into a recess 45 of the frame element 30—than is the case with the lower end 34 locked into place. Consequently, with the overhead bin 14 only hooked in, a ceiling lining component 6 can preferably be clamped easily between the collars 42 and 44, and, when the lower end 34 of the overhead bin is locked in place in the frame element 30, is tensioned in such a manner that it bulges towards the fuselage ceiling, thus assuming the defined ceiling shape of the cabin 4.

Figure 3A:
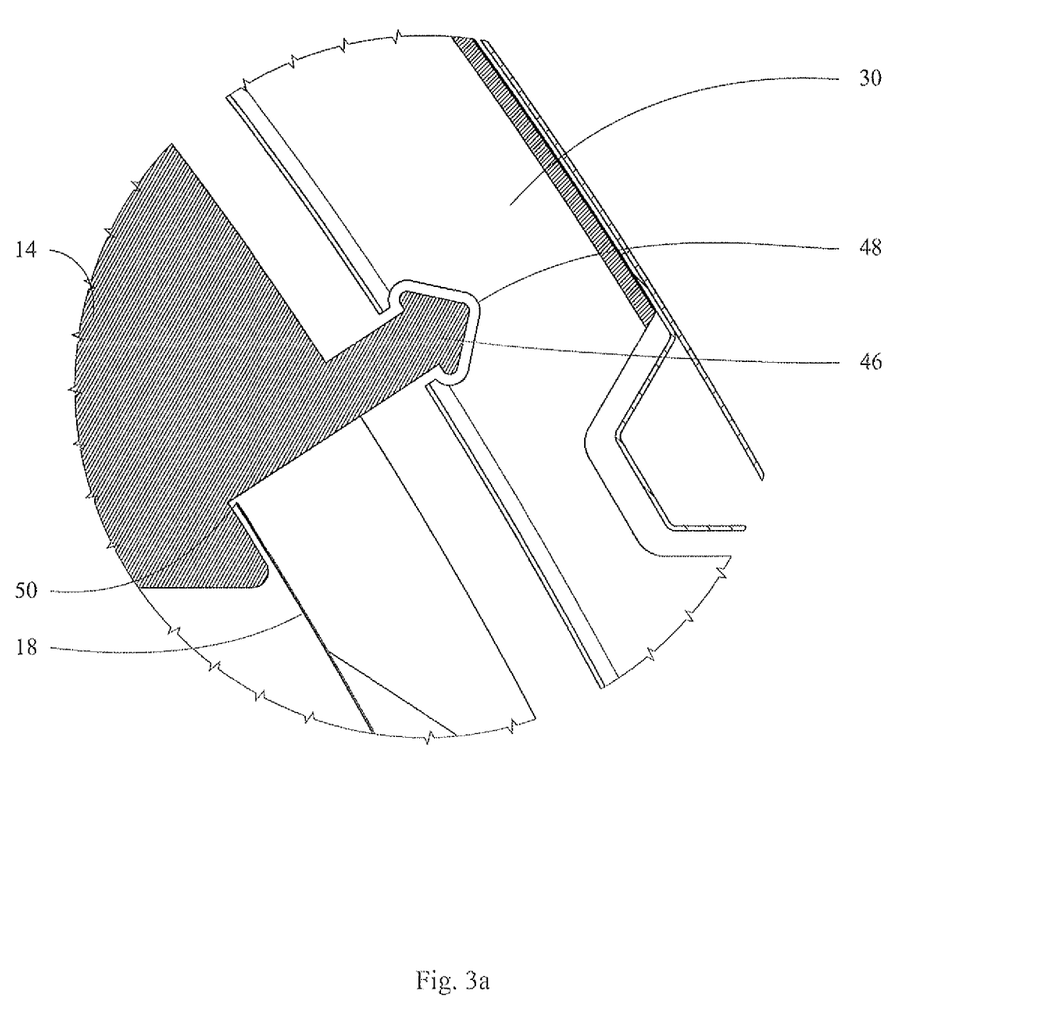
FIG. 3*a*: a detailed view of the lower hatrack attachment to the frame elements and of an inserted lateral lining component.
Figure 3B:
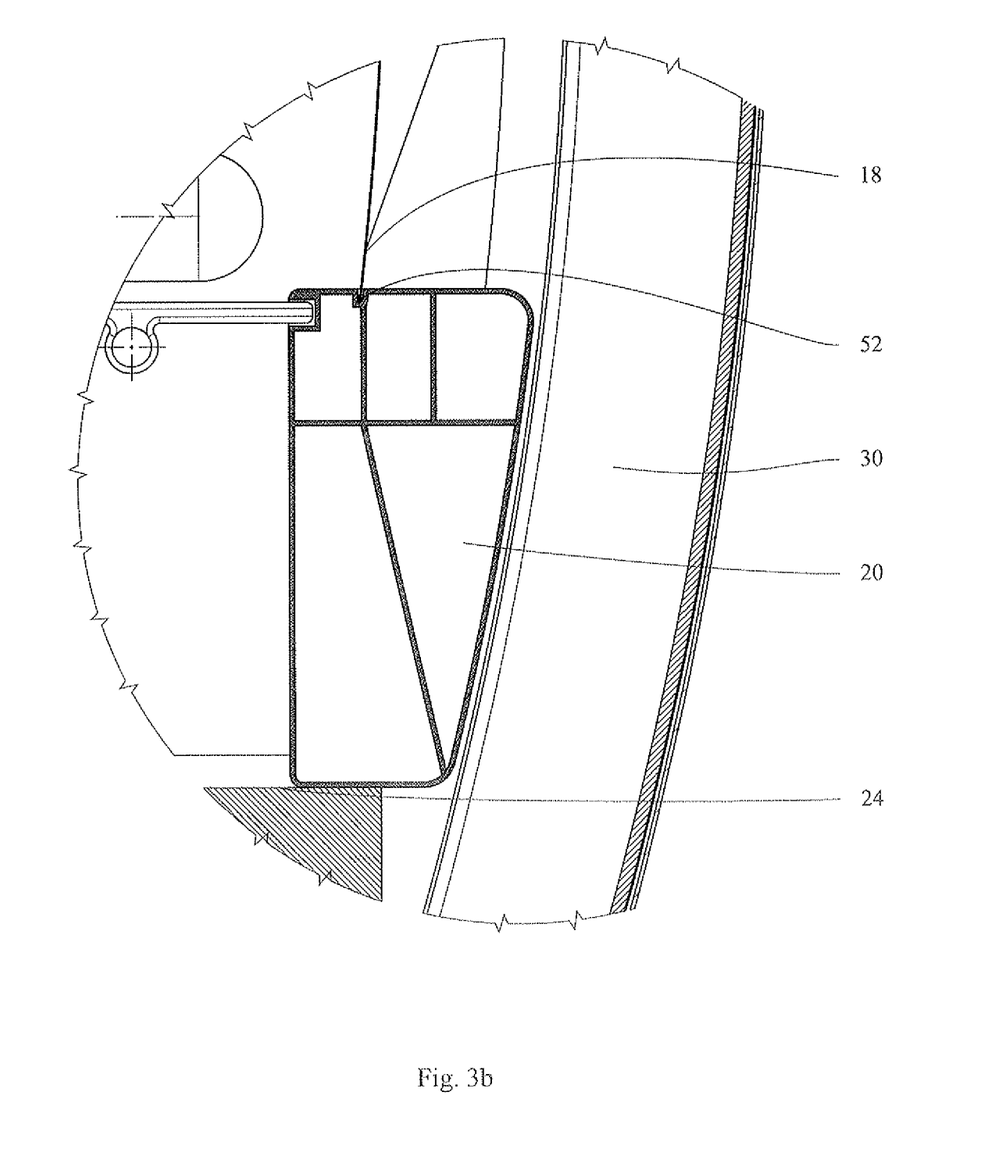
FIG. 3*b*: a detailed view of a supply duct as an interface to the seat adapter and to the lateral lining.

FIG. 3*a* shows a lower end 34 of the overhead bin 14, whose edge in this illustration, as an example, shows a point 46 that is arrow-shaped in cross section or that comprises such a profile which corresponds to a correspondingly-shaped recess 48 in the frame element 30. Furthermore, at the lower end 34 of the overhead bin 14 there is a shoulder 50 into which the right-hand lateral lining component 18 clamps.

The edge of the lateral lining component 18, which edge is opposite said end 34, in turn is clamped into a recess 52 of the supply duct 20 that is situated on the right-hand side of the cabin 4 on the floor 24.

A cabin 4 according to the invention is not limited to the installations shown. Instead, a cabin 4 according to the invention can be designed to incorporate any imaginable cabin equipment components that are required in a modern aircraft. Apart from the normal lining components or overhead bin installations this also includes, for example, toilets and galleys. The installations or monuments can in conjunction with the lining components be of modular design in circumferential direction or radially, and can be combined as desired. The essential point consists of a radially-closed surface resulting, which surface defines a cabin 4 that is designed as a safety cell. Furthermore, it may be required and sensible to use lining components only to define a closed cabin 4. For this reason the lining components should comprise devices in the form of collars 42 and 44 or other positive-locking elements, similar to the overhead bins 10 and 14 shown as examples. Larger tolerances of the lining components used can be compensated for by correspondingly generously designed positive-locking elements.

If individual lining components and/or cabin equipment components are lined up in longitudinal direction so as to join, it is sensible for any lines to be led through the aircraft fuselage 2 to be integrated in the cabin components. This results, in particular, in the aircraft fuselage 2, which is made from a fibre composite material, not to have to assume this function, and thus provides enhanced mechanical strength and quality. In this context it is advantageous if in particular the ceiling beam 36 and the supply ducts 20 and 22 are used for routing essentially all the lines. In this arrangement cabin components or cabin modules that comprise lining components and cabin equipment components according to the invention are to be interconnected, preferably by way of standardised or identical interfaces for all the types of lines that are present, and are to be sealed off from each other by means of seals that are closed on both sides and that are installable from one side.

Lastly, as a supplement or as an alternative to thermal or acoustic insulation between the fuselage 2 and the surfaces of all the installations that face the fuselage 2, a soft filler material, for example an adhesive compound that optionally is electrically conductive, could be used as a lightning protection device or a potential feedback device. In addition, lining the cargo compartment by means of installations according to the invention, for example lateral lining components and other lining components, is imaginable and sensible.

By means of the cabin system according to the invention a cabin that is designed as a closed safety cell can be provided which comprises safe operation, a high degree of modularity, low maintenance, good safety and great variability, and due to its modularity is also particularly future-oriented.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. A cabin system for an aircraft fuselage, comprising:
   a plurality of lining components for lining an interior side of the aircraft fuselage and comprising at least a ceiling lining and a lateral lining; and
   a plurality of cabin equipment components configured to be fixed in the aircraft;
   wherein the cabin equipment components hold outer edges of the lining components so that the lining components are held under tension between the cabin equipment components in the aircraft fuselage, thereby fixing a cabin defined by the plurality of lining components and the plurality of cabin equipment components to the aircraft fuselage;
   wherein at least the ceiling lining and the lateral lining are under tension in circumferential direction as a result of being fixed between the plurality of cabin equipment components; and
   wherein at least one cabin equipment component is configured as an overhead bin arranged above passenger seats, edges of the ceiling lining and the lateral lining being connected to the overhead bin.

2. The cabin system of claim 1, wherein at least one cabin equipment component is configured as a supply duct for leading a line therethrough.

3. The cabin system of claim 1, wherein at least one overhead bin is hooked into a ceiling beam arranged in the upper region of the cabin.

4. The cabin system of claim 1, wherein the overhead bin is configured to be able to be hooked into first recesses of frame elements, and to be locked into place in second recesses by corresponding edges.

5. The cabin system of claim 1, wherein at least one of the lining components or the cabin equipment components comprises an impact-resistant material.

6. The cabin system of claim 5, wherein the impact-resistant material is selected from the group consisting of a glass fibre laminate, an aramid fibre laminate, a glass fibre laminate having additional laminate layers comprising Kevlar, an aramid fibre laminate having additional laminate layers comprising Kevlar, and a combination thereof.

7. The cabin system of claim 1, wherein at least one of the lining components or the cabin equipment components comprises a material having a honeycomb core and layers of thermoplastic material applied to the honeycomb core, and wherein the thermoplastic material comprises indentations projecting into the honeycombs at least on one side.

8. The cabin system of claim 1, wherein the overhead bins comprise devices for inserting lining components.

9. The cabin system of claim 2, wherein the at least one supply duct comprises devices for inserting at least one lining component.

10. The cabin system of claim 8, wherein the lining components are configured to be inserted in at least one of the supply ducts or overhead bins.

11. The cabin system of claim 3, wherein the ceiling beam is adapted to be used for leading through lines.

12. A method for producing a cabin in an aircraft fuselage, the method comprising:
   inserting outer edges of a plurality of lining components into or onto a plurality of cabin equipment components, thereby defining a cabin; the plurality of lining components comprising at least a ceiling lining and a lateral lining;

wherein at least the ceiling lining and the lateral lining are under tension in circumferential direction as a result of being fixed between the plurality of cabin equipment components; and wherein at least one cabin equipment component is configured as an overhead bin arranged above passenger seats, edges of the ceiling lining and the lateral lining being connected to the overhead bin.

\* \* \* \* \*